United States Patent
Gebert et al.

(10) Patent No.: US 7,578,378 B2
(45) Date of Patent: Aug. 25, 2009

(54) VALVE ARRANGEMENT FOR VIBRATION DECOUPLING, WHICH CAN BE CONNECTED BETWEEN A MASTER CYLINDER AND A SLAVE CYLINDER OF A HYDRAULIC FORCE TRANSMISSION SYSTEM

(75) Inventors: Stefan Gebert, Sonnefeld (DE); Matthias Kopp, Bamberg (DE); Jochen Schneier, Zapfendorf (DE); Oswald Müller, Ebern (DE)

(73) Assignee: FTE automotive GmbH, Ebern (DE)

( * ) Notice: Subject to any disclaimer, the term of this patent is extended or adjusted under 35 U.S.C. 154(b) by 326 days.

(21) Appl. No.: 11/412,638

(22) Filed: Apr. 27, 2006

(65) Prior Publication Data

US 2006/0243552 A1 Nov. 2, 2006

(30) Foreign Application Priority Data

May 2, 2005 (DE) .................... 10 2005 020 853

(51) Int. Cl.
F16D 25/12 (2006.01)
F15B 7/06 (2006.01)
F16K 47/00 (2006.01)

(52) U.S. Cl. .................. 192/109 F; 60/469; 192/30 V

(58) Field of Classification Search ............. 192/30 V, 192/91 A, 109 D, 109 F, 85 CA; 60/469, 60/591; 137/493.5, 493.6, 493.9, 517
See application file for complete search history.

(56) References Cited

U.S. PATENT DOCUMENTS

| | | | | |
|---|---|---|---|---|
| 4,006,805 A | * | 2/1977 | Zeller et al. | 192/221 |
| 4,096,882 A | * | 6/1978 | Yano et al. | 137/596.12 |
| 4,976,190 A | * | 12/1990 | Cooney | 91/535 |
| 5,018,352 A | * | 5/1991 | Compton et al. | 60/533 |
| 5,655,567 A | * | 8/1997 | Mikel | 137/513.3 |
| 5,816,046 A | | 10/1998 | Paeth et al. | |
| 6,196,258 B1 | * | 3/2001 | Araki et al. | 137/493.4 |
| 6,378,557 B2 | * | 4/2002 | Kawamura et al. | 137/625.64 |
| 6,405,845 B1 | * | 6/2002 | Muller et al. | 192/30 V |
| 6,499,577 B2 | * | 12/2002 | Kitamoto et al. | 192/85 R |
| 6,564,918 B2 | * | 5/2003 | Itoh | 192/85 C |
| 6,637,271 B1 | * | 10/2003 | Vennefron et al. | 73/669 |
| 6,647,722 B2 | | 11/2003 | Schorr et al. | |
| 6,745,886 B1 | * | 6/2004 | Rey et al. | 192/109 F |
| 2004/0178038 A1 | * | 9/2004 | Takahashi | 192/30 V |
| 2005/0252209 A1 | * | 11/2005 | Grabenstaetter | 60/591 |

FOREIGN PATENT DOCUMENTS

DE 195 00 908 C1 1/1996
JP 59089834 A 5/1984

\* cited by examiner

*Primary Examiner*—Rodney H Bonck
(74) *Attorney, Agent, or Firm*—Reising Ethington P.C.

(57) ABSTRACT

A valve arrangement for vibration decoupling has a housing, in which two valve bodies are accommodated, a first of which is biased by a spring in a reference direction towards a stop integral with the housing and has a through-path for fluid. The other housing is biased by a spring in an opposite direction towards a valve seat on the first valve body and lifts away from the latter in the event of a volume flow in the reference direction, so as to open the through-path for fluid. A further through-path for fluid is provided between the first valve body and the housing, wherein a further valve seat is formed on the stop integral with the housing, towards which further valve seat the first valve body is biased by a spring and lifts away from the valve seat in the event of a volume flow in the opposite direction.

14 Claims, 6 Drawing Sheets

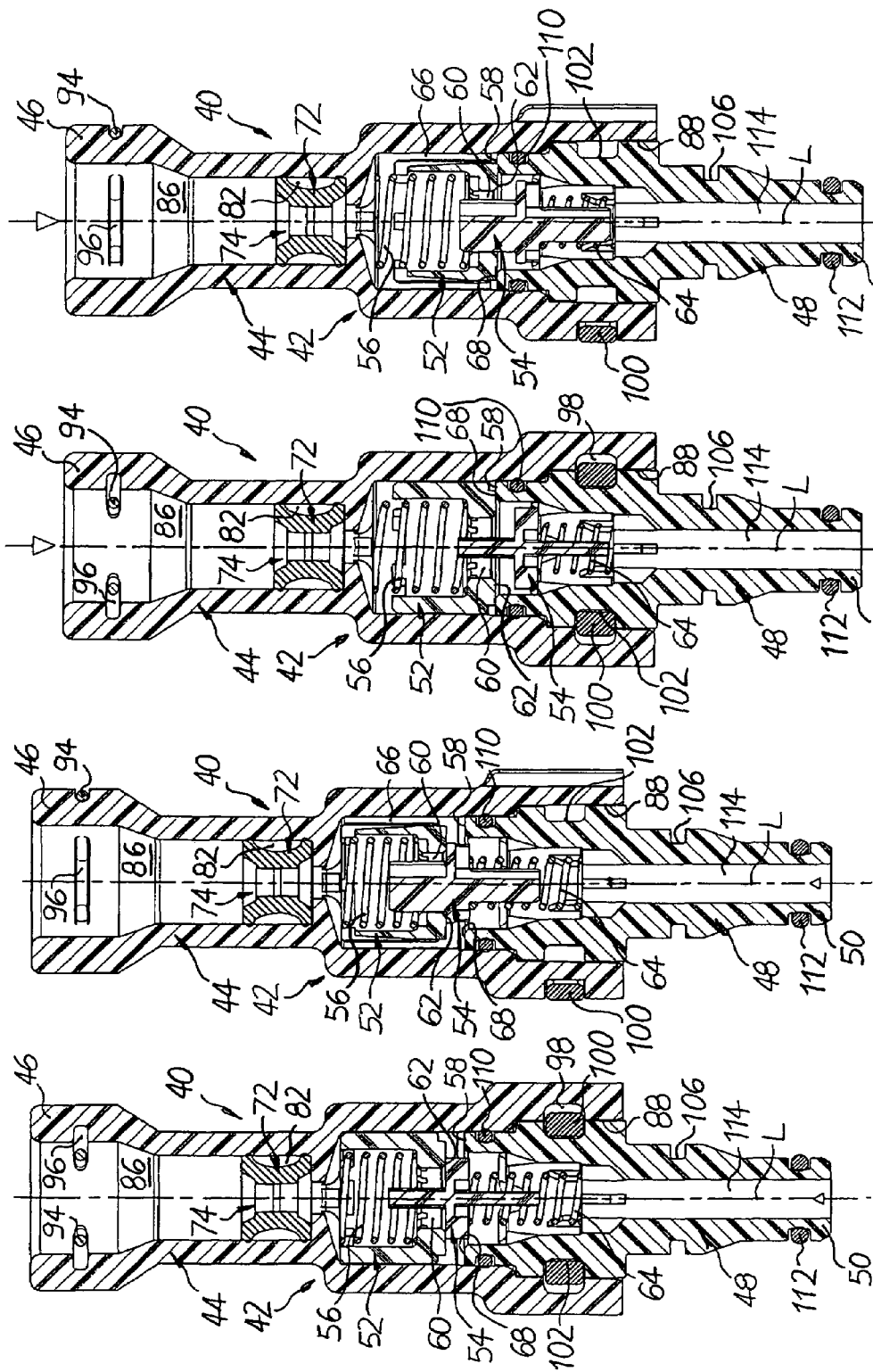

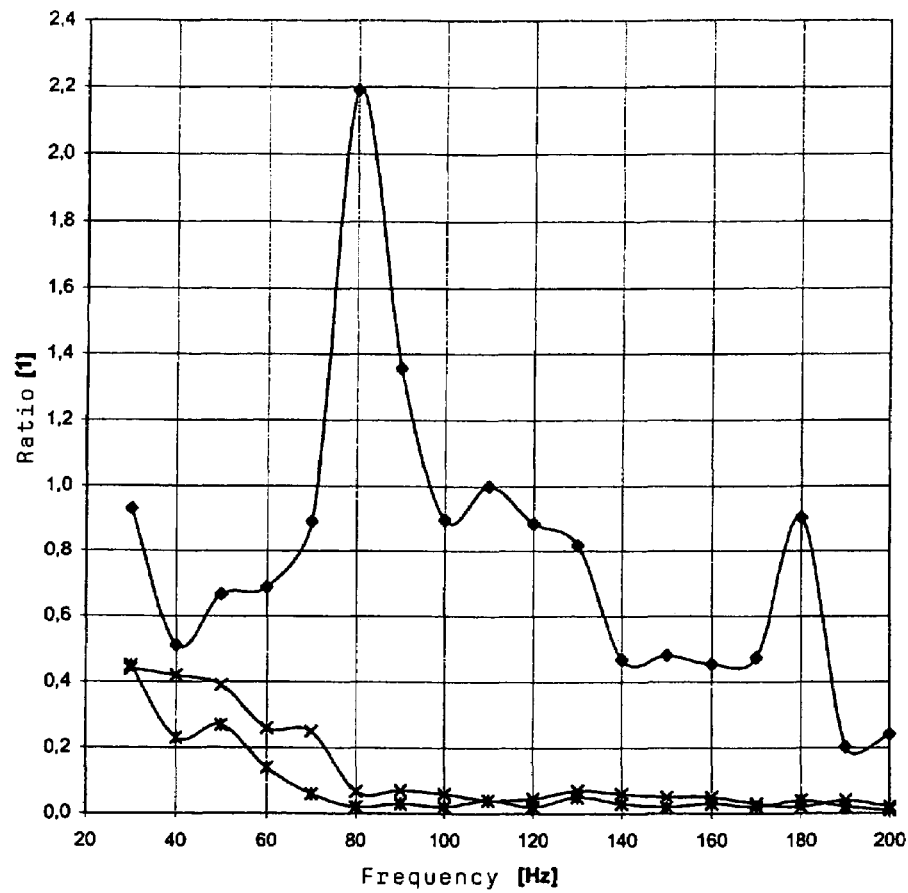
FIG. 23
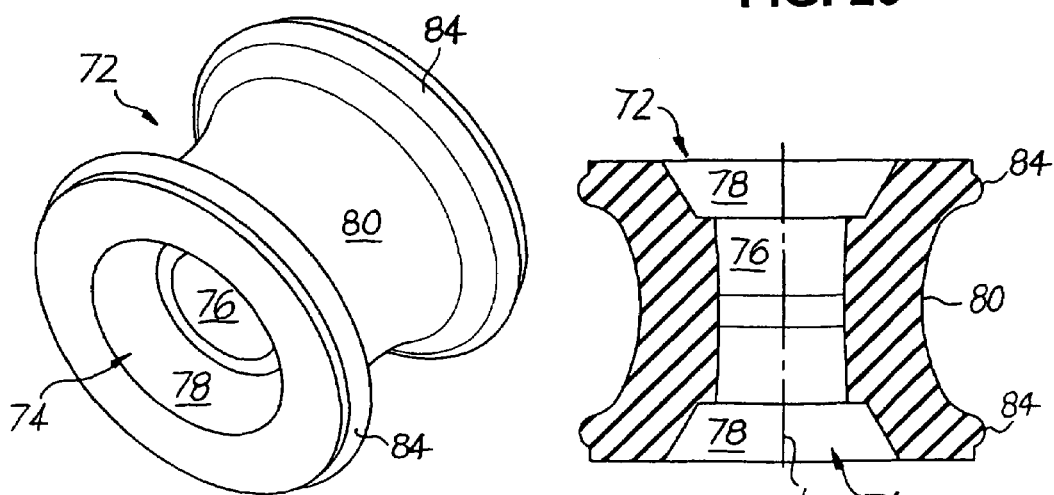
FIG. 21
FIG. 22

VALVE ARRANGEMENT FOR VIBRATION DECOUPLING, WHICH CAN BE CONNECTED BETWEEN A MASTER CYLINDER AND A SLAVE CYLINDER OF A HYDRAULIC FORCE TRANSMISSION SYSTEM

TECHNICAL FIELD

The present invention relates to a valve arrangement for vibration decoupling, which can be connected between a master cylinder and a slave cylinder of a hydraulic force transmission system, and to the use thereof in a hydraulic force transmission system. In particular, the invention relates to a valve arrangement of the type widely used in hydraulic clutch control systems for motor vehicles.

PRIOR ART

A conventional hydraulic clutch control system comprises a master cylinder which can be actuated via a clutch pedal and is connected to a compensating container. The master cylinder is hydraulically connected to a slave cylinder via a pressure line, so that the pressure generated in the master cylinder by pressing down on the clutch pedal can be transmitted to the slave cylinder via the fluid column in the pressure line. As a result, the release bearing of the clutch is acted upon by the slave cylinder with an actuating force, so as, via a clutch release mechanism, to separate the clutch pressure plate from the clutch drive plate and thus to separate the internal combustion engine from the gear mechanism of the motor vehicle.

In such hydraulic clutch control systems, which can be considered as quasi-stationary hydraulic force transmission systems in which there is no continuous flow of hydraulic fluid, the problem arises that vibrations from the internal combustion engine or the crankshaft are transmitted to the clutch pedal via the clutch pressure plate, the clutch release mechanism, the clutch release bearing and the fluid column in the pressure line between the slave cylinder and the master cylinder, so that the clutch pedal vibrates in a way that can be perceived by the driver when he presses it down to release the clutch. The vibrations on the slave cylinder are transmitted to the master cylinder as pressure pulses via the fluid column in the pressure line.

In the prior art, there is no lack of proposals as to how to overcome this problem. For example, devices have been proposed (e.g. DE 195 40 753 C1, DE 101 12 674 C1) which are equipped with a vibrating membrane and are connected into the fluid column between the master cylinder and the slave cylinder, in order to modulate the frequency of the exciter vibration therein or to shift the exciter vibration to higher frequency ranges in such a way that, at the output of the device and on the master cylinder, a higher frequency vibration is produced which the vibrating system consisting of master cylinder and clutch pedal cannot follow on account of its inertia, so that it remains at rest.

The undesirable transmission of vibrations to the master cylinder can also be reduced by means of changes to the line system between the slave cylinder and the master cylinder. Longer lines lead for example to lower vibrations since the damping is greater as a result of the greater flow resistance. The higher mass of the hydraulic fluid in the longer line also plays a part here. The installation of diaphragms or throttles also gives rise to a greater flow resistance and thus to somewhat lower vibrations. However, this form of damping is subject to relatively tight restrictions, since the described measures also give rise to an undesirable increase in the force to be applied to the clutch pedal for rapid operation, particularly at low temperatures. The rate of return of the clutch pedal also decreases undesirably when these measures are used, again particularly at low temperatures, since the hydraulic medium—usually brake fluid—is already relatively viscous here.

Particularly against this background, the thought occurred not to incorporate further damping measures in the system, but rather of providing a real barrier which is independent of the temperature. For example, it has already been proposed in the prior art (e.g. DE 195 00 908 C1, JP 59-89834 A) to connect into the fluid column between master cylinder and slave cylinder a valve arrangement which is biased into a closed position and which opens when the fluid column is displaced and closes when the fluid column is not moved, so as—at least up to a certain amplitude of the pressure pulses in the fluid column—to separate, in terms of vibration, the fluid column section between slave cylinder and valve arrangement from the fluid column section between valve arrangement and master cylinder.

In this connection, the generic document JP 59-89834 A (FIG. 1) discloses a valve arrangement for vibration decoupling, which can be connected between a master cylinder and a slave cylinder of a hydraulic clutch control system, which valve arrangement comprises a housing with a first hydraulic connection which can be connected to the master cylinder and a second hydraulic connection which can be connected to the slave cylinder. Between the hydraulic connections, two valve bodies are accommodated in the housing. The first, piston-like valve body, which is sealed with respect to the housing by means of a sealing element on its outer circumference, is biased by means of a first spring element in a first direction towards a stop integral with the housing and has a through-path for the hydraulic fluid, said through-path being formed by two through-bores. The second, plunger-like valve body is biased by means of a second spring element in a second direction—which is opposite to the first direction—towards a valve seat on the first valve body, so that the second valve body in a basic position of this valve arrangement essentially closes the through-path in the first valve body and, in the event of a volume flow in the first direction, lifts away from the valve seat on the first valve body so as to open the through-path in the first valve body in order to allow the valve arrangement to be flowed through.

In this prior art, actuation of the master cylinder, or more specifically the fluid flow through the first hydraulic connection that is brought about thereby in the first direction, thus causes the second valve body to lift away from the valve seat on the first valve body counter to the force of the second spring element, said first valve body for its part being pushed against the stop integral with the housing as a result of the fluid flow and the spring force of the first spring element. The valve arrangement can thus be flowed through from the master cylinder to the slave cylinder via the open through-path in the first valve body.

In order also to make it possible for the valve arrangement to be flowed through in the opposite direction, that is to say from the slave cylinder to the master cylinder, when the master cylinder is relieved of load and the slave cylinder is reset as a result of the spring forces of the clutch, the second valve body of the valve arrangement penetrates the first valve body with a shaft which in the basic position of the valve arrangement protrudes from the first valve body in the second direction in order to be able to cooperate with a further stop face on the housing. The resetting of the slave cylinder, or more specifically the fluid flow through the second hydraulic connection brought about thereby in the second direction, aided by the force of the second spring element which is transmitted to the first valve body via the second valve body, then causes the first valve body to lift away from the stop integral with the housing counter to the force of the first spring element. When the first valve body, and thus also the second valve body which initially bears against the valve seat thereof, has moved away from the stop integral with the housing by a predefined distance in the second direction, the shaft of the second valve body comes to bear with its end face against the further stop face on the housing. As a result, the movement of the second valve body is stopped, while the first valve body continues to move in the second direction counter to the force of the first spring element. The second valve body stopped by the further stop face on the housing then lifts away from the valve seat on the first valve body, as a result of which the through-path in the first valve body is opened again, via which the valve arrangement can then be flowed through from the slave cylinder to the master cylinder.

Although this previously known valve arrangement has a relatively simple and compact design, it can still be improved in terms of its function. On the one hand, considerable friction losses are associated with the sealing element provided on the outer circumference of the first valve body, and this may have a negative effect in particular on the rate of return of the clutch pedal. On the other hand, at the end of the clutch engagement operation, there may be a considerable delay before the previously known valve arrangement develops its vibration-reducing effect: Once the fluid column has been pushed back from the slave cylinder in the direction of the master cylinder when the valve arrangement is opened, the first spring element gives rise to a resetting movement of the first valve body in the first direction, that is to say in the direction of the stop integral with the housing. Before the first valve body reaches the stop integral with the housing, however, the shaft of the second valve body comes free from the further stop face on the housing, so that the second valve body held away by the second spring element again comes to bear against the valve seat of the first valve body and closes the through-path in the first valve body. On account of the spring force of the first spring element, a residual pressure may then be produced in the fluid column section between the valve arrangement, which is now closed, and the slave cylinder, and this residual pressure prevents the return movement of the first valve body onto the stop integral with the housing or has to be broken down before the first valve body can again come to bear against the stop integral with the housing. However, until the first valve body is pressed against the stop integral with the housing, the valve bodies are free to vibrate with the pressure pulses in the fluid column between the slave cylinder and the master cylinder, so that vibrations induced in the fluid column via the slave cylinder are not prevented by the valve arrangement but rather are transmitted to the master cylinder and thus the clutch pedal.

Based on the prior art according to JP 59-89834 A, the object of the invention is to provide a valve arrangement for vibration decoupling which is designed in as simple and compact a manner as possible and can be connected between a master cylinder and a slave cylinder of a hydraulic force transmission system, which valve arrangement on the one hand has the lowest possible resistance to displacement of the fluid column between the master cylinder and the slave cylinder and on the other hand—compared to the generic prior art—makes it possible to more effectively prevent transmission of vibrations from the slave cylinder to the master cylinder.

SUMMARY OF THE INVENTION

According to the invention, in a valve arrangement for vibration decoupling, which can be connected between a master cylinder and a slave cylinder of a hydraulic force transmission system, said valve arrangement comprising a housing, which has a first and a second hydraulic connection, and two valve bodies, which are accommodated between the hydraulic connections in the housing, wherein the first valve body is biased by means of a first spring element in a first direction towards a stop integral with the housing and has a through-path for the hydraulic fluid, while the second valve body is biased by means of a second spring element in a second direction—which is opposite to the first direction—towards a valve seat on the first valve body, so that the second valve body in a basic position of the valve arrangement completely or almost completely closes the through-path in the first valve body and, in the event of a volume flow in the first direction, lifts away from the valve seat so as to open the through-path in order to allow the valve arrangement to be flowed through, a further through-path for the hydraulic fluid is provided between the first valve body and the housing, wherein a further valve seat is formed on the stop integral with the housing, towards which further valve seat the first valve body is biased, so that the first valve body in the basic position of the valve arrangement completely or almost completely closes the further through-path and, in the event of a volume flow in the second direction, lifts away from the further valve seat so as to open the further through-path in order to allow the valve arrangement to be flowed through.

By providing the further through-path for the hydraulic fluid, which as a result of its (external) position between the first valve body and the housing can easily be designed with a particularly large cross section, so as to oppose the fluid flow in the second direction with only an advantageously low resistance, and by providing the further valve seat on the stop integral with the housing, which in cooperation with the spring-biased first valve body completely or almost completely closes the further through-path (basic position of the valve arrangement) or releases it in the event of a volume flow in the second direction, this means in a simple manner that none of the valve bodies has to travel a certain distance before the respective valve seat is opened. This configuration of the valve arrangement without any "reaction distance" ensures that, as the respective valve body returns under the force of the respectively assigned spring element, no excessive residual pressure which delays a return of the respective valve body to its basic position is produced in the respective fluid column section. In other words, the valve arrangement according to the invention opens immediately in the event of a volume flow—regardless of the direction thereof—and promptly closes when the volume flow is interrupted, so that the valve bodies are always "earthed" against the housing of the valve arrangement when the fluid column is not moving and thus essentially keep pressure pulses in one fluid column section on the slave cylinder side away from the other fluid column section on the master cylinder side.

Moreover, the sealing element provided in the generic prior art between the first valve body and the housing is omitted in the valve arrangement according to the invention, so that the friction losses associated therewith, which may have a negative effect in particular on the rate of return of the clutch pedal, advantageously do not occur in the valve arrangement according to the invention.

Preferably, the sealing faces of the valve seats are arranged with respect to the directions of displacement of the valve bodies in such a way that the sealing face of the (first) valve seat and/or the sealing face of the further valve seat is perpendicular to the displacement direction of the first and/or second valve body, so that, when the respective valve body is displaced, as large a cross section as possible is released for the flow between the respective valve body and the associated valve seat, in order to ensure as low a flow resistance as possible. If the sealing face of the (first) valve seat and the sealing face of the further valve seat lie in one plane in the basic position of the valve arrangement, a valve arrangement which is advantageously compact in the axial direction is obtained.

With regard in particular to simple installation of the valve arrangement, it is preferred if the housing of the valve arrangement is split into two parts, comprising a base part and an insertion part secured therein, wherein the valve bodies and the spring elements are arranged between the base part and the insertion part. Advantageously, an end face of the insertion part may form the stop integral with the housing for the first valve body, so that no further components have to be provided for this and no further measures have to be taken for this.

In principle, it is conceivable to guide the second valve body—like the first valve body—on the housing of the valve arrangement. However, particularly with regard to a low space requirement, a configuration is preferred in which the second valve body is guided on the first valve body. In this case, in one technically simple embodiment, the second valve body may be provided on its outer circumference with a plurality of webs which serve to guide the second valve body in a bore of the first valve body and—at the same time—together with the wall of the valve body bore delimit the (first) through-path.

Likewise, the first valve body may be provided on its outer circumference with a plurality of ribs which serve to guide the first valve body in a bore of the housing and—at the same time—together with the wall of the housing bore delimit the further through-path, and this can also be implemented in a simple manner in manufacturing terms.

In principle, different types of spring (including Belleville washers) and modes of action (pressure or tension) are conceivable for the spring elements of the valve arrangement. However, particularly for cost reasons, it is preferred if the first spring element and/or the second spring element is a helical pressure spring.

In principle, the main parts of the valve arrangement may be made of a metallic material, for example an aluminum alloy, for instance by cutting machining. However, particularly to obtain a cost-effective valve arrangement, it is advantageous if the housing or the parts thereof and/or the first valve body and/or the second valve body is injection-molded from plastic.

Continuing the concept of the invention, a flow transducer may be mounted in a bore of the housing of the valve arrangement, adjacent to the first or second valve body, which flow transducer can be elastically deformed under pressure in order to dampen or reduce residual vibrations. Such residual vibrations may arise when the pressure amplitudes of the pressure pulses in the fluid column, namely in the fluid column section between the slave cylinder and the valve arrangement, are greater than the opening pressure of the valve arrangement, which depends on the spring force of the respective spring element and on the hydraulic active surface area of the respective valve body. A small amount of residual vibrations could moreover be transmitted via a compensating groove which is optionally formed on a valve seat and/or a valve body, which compensating groove, in the event of any filling of the hydraulic force transmission system with vacuum pressure, is intended to ensure that a vacuum can be drawn.

Finally, such a flow transducer is also effective for reducing vibrations when the valve arrangement is opened as a result of a displacement of the fluid column between the master cylinder and the slave cylinder, that is to say in the event of hydraulic clutch actuation during release or engagement of the clutch, so that pressure pulses can pass through said valve arrangement.

Preferably, the flow transducer is a rubber-elastic, spool-shaped element comprising a through-bore which allows the flow transducer to be flowed through and an annular recess on the outer circumference which together with an inner circumferential face of the housing bore forms an annular air chamber. In such a configuration of the flow transducer, when a pressure amplitude passes through the through-bore, the spool-shaped element is deformed counter to the spring effect of the rubber-elastic material, whereby the air volume in the annular air chamber is compressed, so that the spool-shaped element—as already implied by the term "flow transducer"—undergoes a defined expansion in the region of the through-bore, which leads to a certain "relieving" of the pressure amplitude. The spring effect of the rubber-elastic material and of the compressed air volume ensures an automatic return of the spool-shaped element to its original shape when the pressure in the fluid column in the region of the through-bore of the spool-shaped element falls below a predefined value.

In order to simplify the installation of the flow transducer, namely installation thereof in a way which is not dependent on the direction of flow, the flow transducer may be designed to be rotationally symmetrical with respect to a longitudinal axis and mirror-symmetrical with respect to an imaginary plane perpendicular to the longitudinal axis.

When used in a hydraulic force transmission system comprising a master cylinder which is hydraulically connected to a slave cylinder via a hydraulic line, the valve arrangement according to the invention may be connected into the hydraulic line in such a way that the first hydraulic connection of the valve arrangement is hydraulically connected to the master cylinder and the second hydraulic connection of the valve arrangement is hydraulically connected to the slave cylinder. However, the proposed valve arrangement can also be installed conversely, so that the first hydraulic connection is connected to the slave cylinder and the second hydraulic connection is connected to the master cylinder, particularly when the spring forces of the spring elements and the hydraulic active surface areas of the valve bodies are designed such that the opening pressures of the valve arrangement are the same in both through-flow directions of the valve arrangement.

As studies by the Applicant have shown, in a conventional hydraulic clutch control system without an interconnected valve arrangement, the pressure amplitude of the pressure pulses in the fluid column between slave cylinder and master cylinder is usually lower on the master cylinder than on the slave cylinder. This applies in particular in the case of resonance. It therefore appears to be advantageous to use the valve arrangement according to the invention in the vicinity of the master cylinder. However, it has been found that the vibration-related system behaviour is fundamentally changed by using a valve arrangement according to the invention. In a conventional hydraulic clutch control system without a valve arrangement, the hydraulic line opened into the relatively high-volume, "soft" master cylinder, so that no high pressure amplitudes could build up here; the master cylinder acted almost as an "open end" of the hydraulic line. However, the valve arrangement is a closed end of the hydraulic line while the valve arrangement remains closed, which is desirable for decoupling or reducing vibration. However, experience has shown that the highest pressure amplitudes occur at a closed end. It is thus preferred if the valve arrangement is connected into the hydraulic line closer to the slave cylinder than to the master cylinder. Nevertheless, if there is no fear of resonance effects in a given line system, use of the valve arrangement close to the master cylinder may be advantageous, since then, due to the damping resulting from the length of the hydraulic line between slave cylinder and valve arrangement, somewhat lower pressure amplitudes may occur close to the master cylinder than at the slave cylinder.

With regard to the installation situation of the valve arrangement when used in a hydraulic force transmission system, the structure may furthermore be configured such that the aforementioned flow transducer is arranged between the slave cylinder and the valve bodies in the housing of the valve arrangement, so that the flow transducer is seated in front of the valve bodies from the point of view of the pressure pulses arriving from the slave cylinder. This has the advantage that, at this point where large pressure amplitudes occur, these can be somewhat reduced as a result of the elasticity of the flow transducer. As an alternative to this—or in addition, namely when use is made of two flow transducers, one of which is seated in front of and the other behind the valve bodies—the design may finally be such that the flow transducer is arranged between the master cylinder and the valve bodies in the housing of the valve arrangement. This has the advantage on the one hand that, when the pressure amplitudes are greater than the opening pressure of the valve arrangement, which can lead to a brief opening of the valve arrangement, the "excess" of the pressure amplitudes running through the valve arrangement can be reduced; on the other hand, the advantage is obtained that residual vibrations, which run through a compensating groove that may for example be present, can be reduced.

BRIEF DESCRIPTION OF THE DRAWINGS

The invention will be explained in more detail below on the basis of a preferred example of embodiment and with reference to the accompanying, partially schematic drawings, in which elastomeric parts are shown in the non-deformed state in order to simplify the drawings. In the drawings:

FIG. 4 shows a longitudinal sectional view of the valve arrangement according to FIG. 2, which differs from the valve arrangement shown in FIG. 2 in that it is shown in a state flowed through from below, in which a first valve body is lifted away from an associated valve seat on a stop integral with the housing, FIG. 5 shows a longitudinal sectional view of the valve arrangement according to FIG. 4, which has been rotated through 45° about its longitudinal axis with respect to the diagram in FIG. 4, FIG. 6 shows a longitudinal sectional view of the valve arrangement according to FIG. 2, which differs from the valve arrangement shown in FIG. 2 in that it is shown in a state flowed through from above, in which a second valve body is lifted away from an associated valve seat on the first valve body, FIG. 7 shows a longitudinal sectional view of the valve arrangement according to FIG. 6, which has been rotated through 45° about its longitudinal axis with respect to the diagram in FIG. 6, FIG. 17 shows a perspective view of a second valve body of the valve arrangement according to FIG. 2, on an enlarged scale compared to the diagrams in FIGS. 2 to 7, FIG. 18 shows a side view of the second valve body according to FIG. 17, FIG. 19 shows a plan view of the second valve body according to FIG. 17, from above in FIG. 18, FIG. 20 shows a cross-sectional view of the second valve body according to FIG. 17, along the section line XX-XX in FIG. 18, FIG. 21 shows a perspective view of a spool-shaped, elastomeric flow transducer of the valve arrangement according to FIG. 2, on an enlarged scale compared to the diagrams in FIGS. 2 to 7, FIG. 22 shows a longitudinal sectional view of the flow transducer according to FIG. 21, and FIG. 23 shows a diagram in which there is plotted, for a hydraulic clutch control system without a valve arrangement according to the invention (rhombus marking), a hydraulic clutch control system with a valve arrangement according to the invention but without a flow transducer (cross marking) and a hydraulic clutch control system with a valve arrangement according to the invention and with a flow transducer (star marking), the ratio of the acceleration measured on a piston rod of the master cylinder to the acceleration measured on a piston rod of the slave cylinder, over frequency, as the result of a test in which a sine vibration with variable frequency and an amplitude of 1 g (9.81 m/s$^2$) was applied to the piston rod of the slave cylinder.

DETAILED DESCRIPTION OF THE EXAMPLE OF EMBODIMENT

Figure 1:
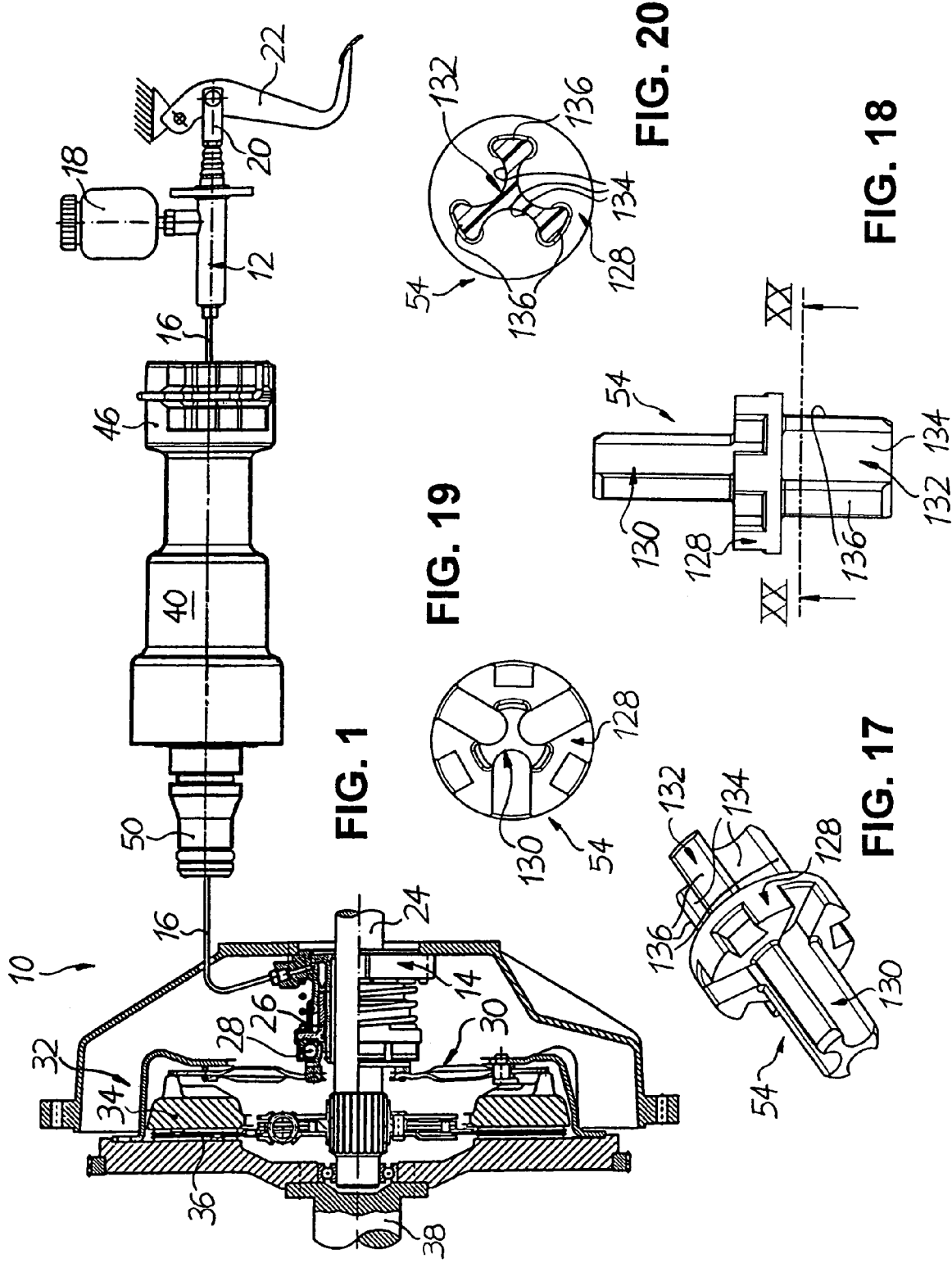
FIG. 1 shows a basic representation of a hydraulic clutch control system in which a valve arrangement according to the invention for vibration decoupling is connected into a pressure line between a master cylinder and a slave cylinder.

FIG. 1 shows, by way of example of a hydraulic force transmission system, a hydraulic clutch control system 10 for motor vehicles, which in a manner known per se comprises a master cylinder 12 and a slave cylinder 14 which are hydraulically connected to one another via a hydraulic line 16. The piston (not shown) of the master cylinder 12 connected to a compensating container 18 is actively connected via a piston rod 20 to a clutch pedal 22, so that the master cylinder 12 can be actuated by pressing down on the clutch pedal 22. In the process, a fluid column is pushed through the hydraulic line 16 in the direction of the slave cylinder 14, said fluid column hydraulically acting on the slave cylinder 14. The slave cylinder 14, in the illustrated example of embodiment an annular cylinder which is also referred to as the "central clutch release" on account of its concentric arrangement with respect to a gear shaft 24, more specifically the annular piston 26 thereof, is in active connection via a clutch release bearing 28 with a clutch release mechanism 30 of a friction clutch 32, so that, when the slave cylinder 14 is acted upon hydraulically to release the friction clutch 32, a clutch pressure plate 34 is separated from a clutch drive plate 36 of the friction clutch 32 by means of the release mechanism 30 and thus the internal combustion engine (not shown) is separated from the gear mechanism (likewise not shown) of the motor vehicle.

When the clutch pedal 22 is released so as to re-engage the friction clutch 32, the slave cylinder 14, or more specifically the annular piston 26 thereof, is returned to its basic or starting position again as a result among other things of the spring forces of the friction clutch 32, whereby the abovementioned fluid column is pushed back through the hydraulic line 16 in the direction of the master cylinder 12. The further design and the further function of such a hydraulic clutch control system 10 are sufficiently known to those skilled in the art, so that there is no need for detailed explanations in this respect at this point.

In such a hydraulic clutch control system 10, vibrations from the internal combustion engine (not shown), particularly from the crankshaft 38 thereof, are transmitted via the components of the friction clutch 32 and the slave cylinder 14 into the fluid column located in the hydraulic line 16 between slave cylinder 14 and master cylinder 12, in which they propagate as pressure pulses. In order to keep these pressure pulses away from the master cylinder 12 and thus the clutch pedal 22, on which they would be perceived by the operator particularly when the foot rests on the clutch pedal 22 in the typical urban driving mode or when the clutch pedal 22 is kept pressed down, for example at traffic lights, a valve arrangement 40 which is biased into a closed position is connected into the hydraulic line 16 between the master cylinder 12 and the slave cylinder 14, which valve arrangement will be explained in more detail below with reference to FIGS. 2 to 23. The valve arrangement 40, which is designed as a "dual-action" inlet pressure valve, opens in the event of any displacement of the fluid column, that is to say both in the event of a displacement in the direction of the slave cylinder 14 and in the event of a displacement in the direction of the master cylinder 12, and closes when the fluid column is not moving, so as to separate, in terms of vibrations, the fluid column section between the slave cylinder 14 and the valve arrangement 40 from the fluid column section between the valve arrangement 40 and the master cylinder 12, or to decouple said fluid column sections in terms of vibrations, at least until the pressure amplitude of the pressure pulses in the fluid column falls below a predefined value.

As shown in FIGS. 2 to 7, the valve arrangement 40 has a two-part housing 42, comprising a base part 44 (shown individually in FIGS. 10 and 11), which has a first hydraulic connection 46, and an insertion part 48 (shown separately in FIG. 12), which is secured in the base part 44 and forms a second hydraulic connection 50. In the example of embodiment shown in FIG. 1, the valve arrangement 40 is hydraulically connected to the master cylinder 12 via the first hydraulic connection 46, while the second hydraulic connection 50 serves to hydraulically connect it to the slave cylinder 14. The valve arrangement 40 may however be used in a manner rotated through 180°, so that the first hydraulic connection 46 is connected to the slave cylinder 14 while the second hydraulic connection 50 is connected to the master cylinder 12.

The valve arrangement 40 moreover has two valve bodies 52, 54, which are accommodated between the hydraulic connections 46, 50 in the housing 42, or more specifically between the base part 44 and the insertion part 48 of the housing 42. The piston-like first valve body 52 (shown individually in FIGS. 13 to 16) is biased by means of a first spring element 56 in the form of a helical pressure spring in a first direction, that is to say downwards in FIGS. 2 to 7 towards a stop integral with the housing, said stop being formed in these figures by an upper, annular end face 58 of the insertion part 48. This basic or rest position of the first valve body 52 is shown in FIGS. 2, 3, 6 and 7. The first valve body 52 furthermore has a central through-path 60 for the hydraulic fluid, and has on its side facing towards the second valve body 54 a valve seat 62 for the second valve body 54.

Figure 2:
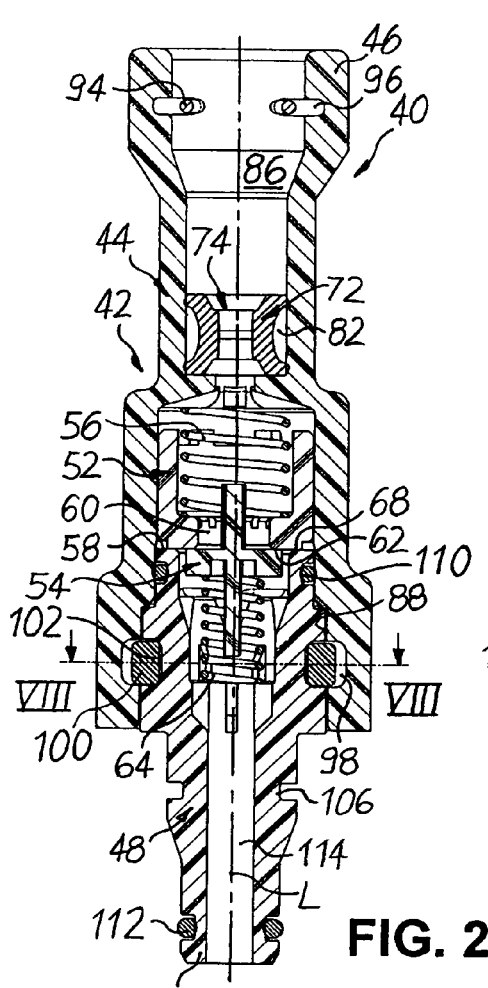
FIG. 2 shows a longitudinal sectional view of the valve arrangement according to FIG. 1, in the closed state and on a somewhat enlarged scale compared to the diagram in FIG. 1.
Figure 3:
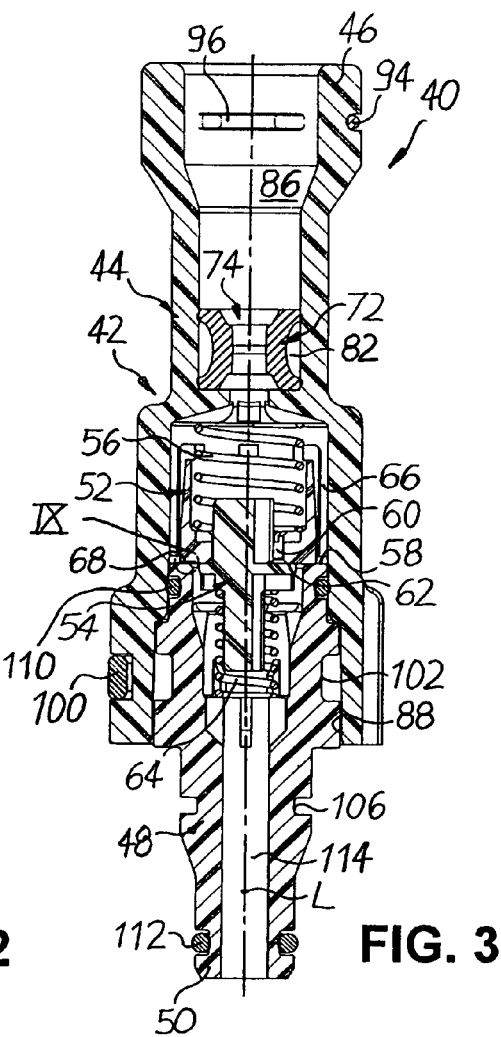
FIG. 3 shows a longitudinal sectional view of the valve arrangement according to FIG. 2 in the closed state, which has been rotated through 45° about its longitudinal axis with respect to the diagram in FIG. 2.
Figure 8:
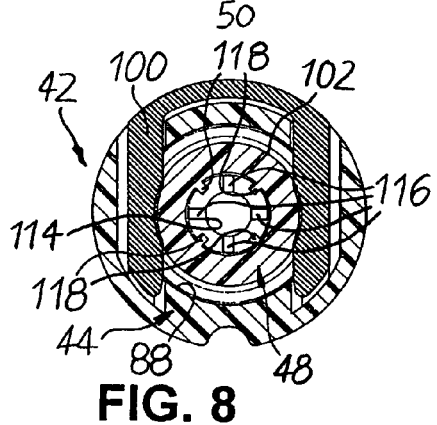
FIG. 8 shows a cross-sectional view of the valve arrangement according to FIG. 2, along the section line VIII-VIII in FIG. 2.

The plunger-like second valve body 54 (shown separately in FIGS. 17 to 20) is biased by means of a second spring element 64 in the form of a helical pressure spring in a second direction—which is opposite to the first direction—that is to say upwards in FIGS. 2 to 7 towards the valve seat 62 on the first valve body 52. As a result, in the basic position of the valve arrangement 40 as shown in FIGS. 2 and 3, the second valve body 54 closes the central through-path 60 for the hydraulic fluid in the first valve body 52. By contrast, when the master cylinder 12 is actuated to give rise to a volume flow in the first direction, that is to say via the first hydraulic connection 46, the second valve body 54 lifts away from the valve seat 62 on the first valve body 52 counter to the force of the second spring element 64, so as to open the central through-path 60 in the first valve body 52 in order to allow the valve arrangement 40 to be flowed through, while the first valve body 52 is pressed against the end face 58 of the insertion part 48 of the housing 42. This state is shown in FIGS. 6 and 7.

With regard to a flow through the valve arrangement 40 in the second direction, that is to say from bottom to top in FIGS. 2 to 7, a further through-path 66 for the hydraulic fluid is formed between the first valve body 52 and the housing 42, or more specifically the outer circumference of the first valve body 52 and the inner circumference of the base part 44 of the housing 42, as can be seen in particular from FIGS. 3, 5 and 7. Furthermore, a further valve seat 68 is provided on the end face 58 which forms the stop integral with the housing, towards which further valve seat 68 the first valve body 52 is biased by means of the first spring element 56. It can be seen from FIGS. 2 to 7 that the sealing face of the valve seat 62 on the first valve body 52 and the sealing face of the further valve seat 68 on the housing 42 are on the one hand perpendicular to the direction of displacement of the first and second valve body 52, 54 and on the other hand are arranged concentrically such that the sealing faces of the valve seats 62, 68 lie in one plane in the basic position of the valve arrangement 40 (FIGS. 2 and 3).

Figure 9:
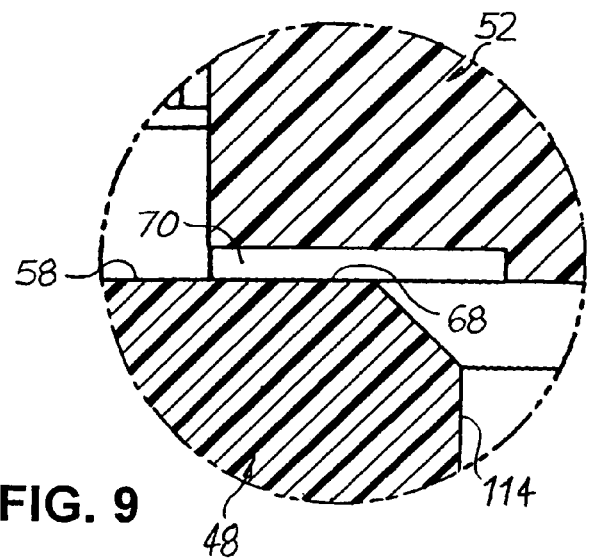
FIG. 9 shows a greatly enlarged representation of the detail IX in FIG. 3, which shows a compensating groove in the first valve body.

As a result, in the basic position of the valve arrangement 40, as shown in FIGS. 2 and 3, the first valve body 52 essentially closes the further through-path 66 between the first valve body 52 and the housing 42 with its lower end face in said figures—the term "essentially" being used here since the first valve body 52, as shown in FIGS. 3 and 9, may be provided on its lower end face with a compensating groove 70 running in the radial direction, so as, in the event of the hydraulic clutch control system 10 being filled with a vacuum pressure, to allow the "drawing" of a vacuum in the hydraulic line 16. By contrast, when a volume flow is produced in the second direction during the return movement of the annular piston 26 in the slave cylinder 14, that is to say a volume flow via the second hydraulic connection 50, the first valve body 52 lifts away from the further valve seat 68 on the insertion part 48 counter to the force of the first spring element 56, so as to open the further through-path 66 in order to allow the valve arrangement 40 to be flowed through, while the second valve body 54 is pressed against the valve seat 62 on the first valve body 52 by means of the second spring element 64. This state is shown in FIGS. 4 and 5.

It can be seen from the above description that the valve arrangement 40 opens when there is a volume flow via the first hydraulic connection 46 or when there is a volume flow via the second hydraulic connection 50, but on the other hand, when there is no volume flow, closes as a result of the biasing of the valve bodies 52, 54 by means of the spring elements 56, 64, so as to split the fluid column for the purpose of vibration decoupling. It should also be mentioned in this connection that, in the illustrated example of embodiment, the hydraulic active surface area on the second valve body 54 which faces towards the first hydraulic connection 46 and the spring force of the second spring element 64 on the one hand, and the hydraulic active surface area on the first valve body 52 which faces towards the second hydraulic connection 50 and the spring force of the first spring element 56 on the other hand, are adapted to one another in such a way that the opening pressure of the valve arrangement 40, which may be for example 0.8 bar, is approximately the same in both flow directions. However, depending on the respective requirements of the hydraulic force transmission system on which the valve arrangement is to be used, the hydraulic active surface areas of the valve bodies and the spring forces of the spring elements may also be adapted to one another in a different way, so that the opening pressure of the valve arrangement in one flow direction is different from the opening pressure of the valve arrangement in the other flow direction.

In order to dampen or reduce residual vibrations which (1.) may occur when the pressure amplitudes of the pressure pulses in the fluid column are greater than the respective opening pressure of the valve arrangement 40, (2.) may still be transmitted via the optionally present compensating groove 70, and (3.) can pass through the through-path 60 or 66 which has opened as a result of a volume flow being applied to the valve arrangement 40, in the illustrated example of embodiment a flow transducer 72 is mounted in the housing 42, adjacent to the first valve body 52, which flow transducer can be elastically deformed under pressure.

The flow transducer 72, which is shown in greater detail in FIGS. 21 and 22, is a rubber-elastic, essentially spool-shaped element which has a through-bore 74 that allows the flow transducer 72 to be flowed through, the through-bore 74 comprising a central cylindrical section 76 and widening funnels 78 located on either side of the cylindrical section 76. The flow transducer 72, which is designed to be rotationally symmetrical with respect to its longitudinal axis L and mirror-symmetrical with respect to an imaginary plane perpendicular to the longitudinal axis L, is provided on its outer circumference with a channel-like annular recess 80 which, as shown in FIGS. 2 to 7, together with the housing 42, or more specifically the base part 44 thereof, delimits an annular air chamber 82 which is sealed on both sides, that is to say at the top and at the bottom in FIGS. 2 and 7, by annular sealing beads 84 (see FIGS. 21 and 22) of the flow transducer 72. The mode of action of this flow transducer 72, along with variant arrangements of the flow transducer 72 in e.g. the hydraulic clutch control system 10—in front of or behind the valve bodies 52, 54 as seen from the slave cylinder 14—have already been described in detail in the introduction, so that there is no need for any further details in this respect at this point.

FIGS. 10 to 20 in particular show further details regarding the main constituents of the valve arrangement 40, namely the base part 44 of the housing 42 (FIGS. 10 and 11), the insertion part 48 of the housing 42 (FIG. 12), the first valve body 52 (FIGS. 13 to 16) and the second valve body 54 (FIGS. 17 to 20), which in the illustrated example of embodiment are all injection-molded from a suitable plastic, for example a glass-fibre-reinforced PA 66, and accordingly in each case have essentially constant wall thicknesses and suitable draft angles.

For example, the base part 44 of the housing 42, starting from both end sides, is in each case provided with a stepped blind hole 86, 88 which in each case end at a bottom 90, through which there runs a central connecting hole 92 which connects the blind holes 86, 88 to one another. The upper blind hole 86 in FIG. 10 serves on the one hand, as shown in FIGS. 2 to 7, to tightly receive the flow transducer 72, which according to FIGS. 2 to 7 bears against the upper side of the bottom 90; on the other hand, it serves to receive a plug-in part (not shown) of the hydraulic line 16, which can be secured in the blind hole 86 in a manner known per se by means of a securing element 94 made of spring steel wire, which engages in an insertion slot 96 in the base part 44, said insertion slot running transversely to the longitudinal axis L.

Figures 10, 12:
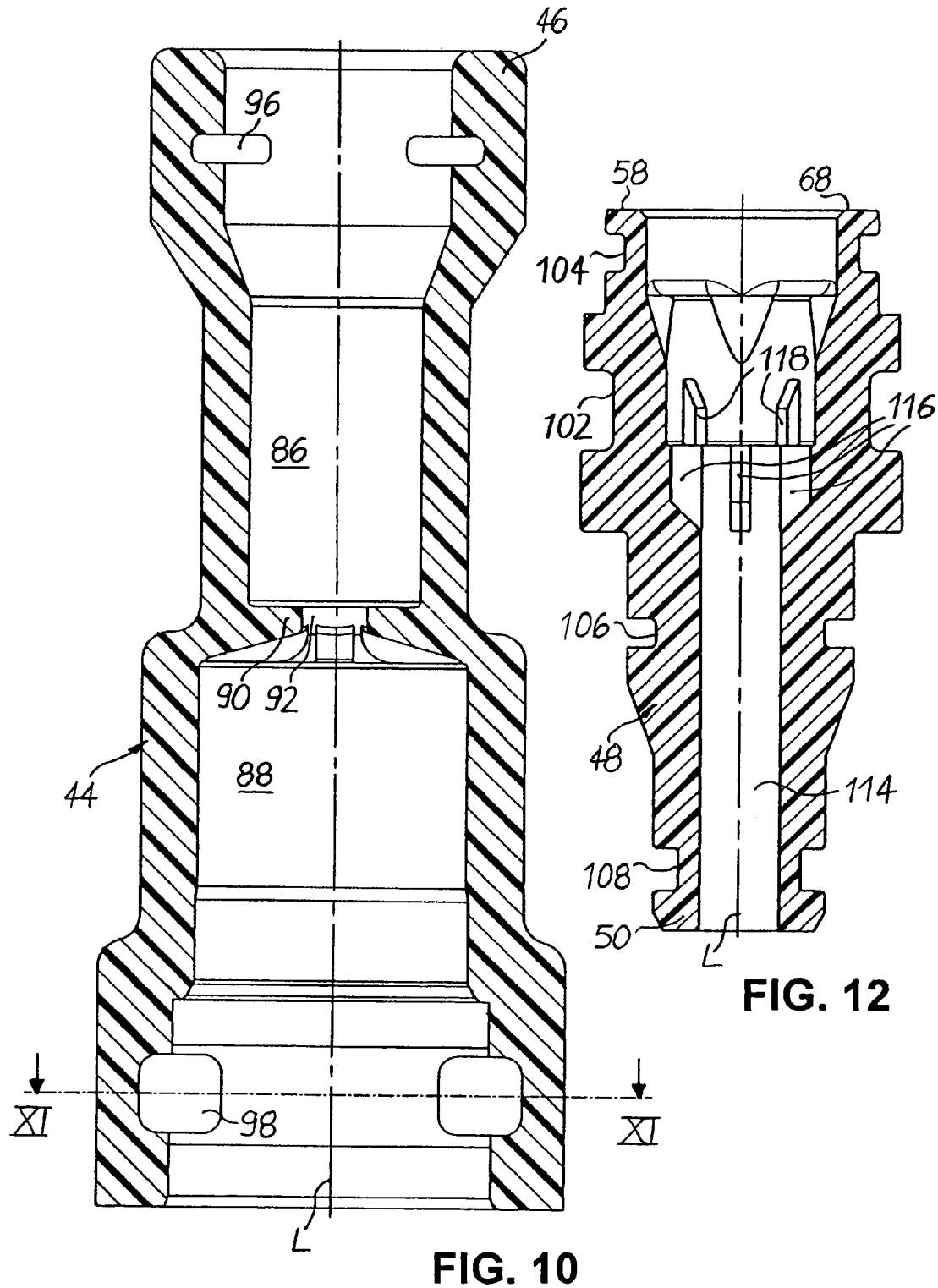
FIG. 10 shows a longitudinal sectional view of a base part of the housing of the valve arrangement according to FIG. 2, on an enlarged scale compared to the diagrams in FIGS. 2 to 7.
FIG. 12 shows a longitudinal sectional view of an insertion part of the housing of the valve arrangement according to FIG. 2, on an enlarged scale compared to the diagrams in FIGS. 2 to 7.
Figure 11:
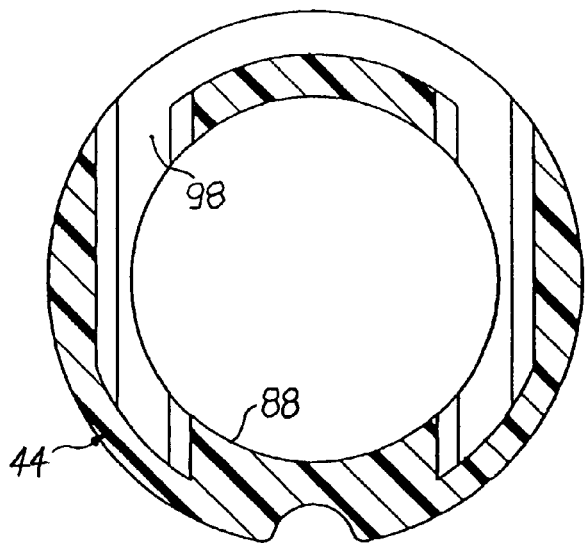
FIG. 11 shows a cross-sectional view of the base part of the housing of the valve arrangement according to FIG. 2, along the section line XI-XI in FIG. 10.
Figure 14:
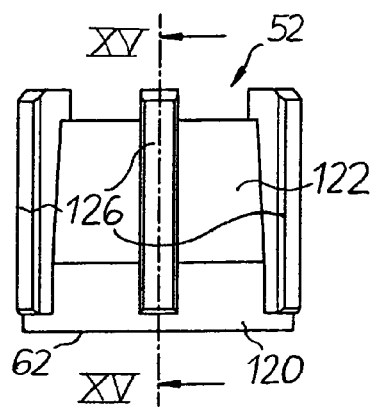
FIG. 14 shows a side view of the first valve body according to FIG. 13.
Figure 13:
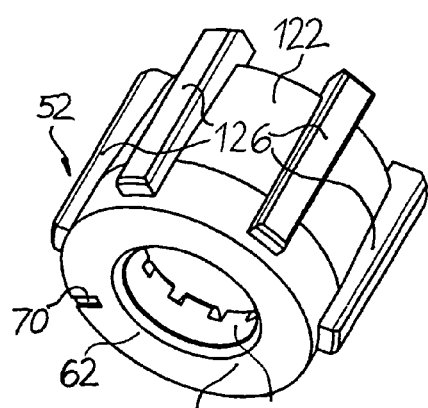
FIG. 13 shows a perspective view of a first valve body of the valve arrangement according to FIG. 2, on an enlarged scale compared to the diagrams in FIGS. 2 to 7.
Figure 15:
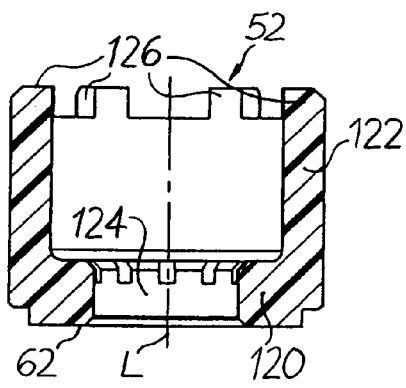
FIG. 15 shows a cross-sectional view of the first valve body according to FIG. 13, along the section line XV-XV in FIG. 14.
Figure 16:
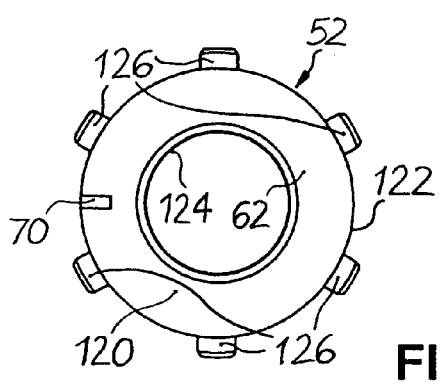
FIG. 16 shows a bottom view of the first valve body according to FIG. 13, from below in FIG. 14.

The lower blind hole 88 in FIG. 10, seen in the direction starting from the bottom 90, serves firstly to receive and axially guide the first valve body 52, which is biased downwards by means of the first spring element 56 in FIGS. 2 to 7, wherein the first spring element 56 is supported on the bottom 90; this blind hole 88 furthermore serves to receive the insertion part 48 such that the valve bodies 52, 54 and the spring elements 56, 64 are arranged between the base part 44 and the insertion part 48. As shown in particular in FIGS. 2, 8, 10 and 11, the base part 44 of the housing 42 is also provided, in the region of the lower blind hole 88 and close to its end side, with an insertion slot 98 which extends transversely to the longitudinal axis L and which serves to receive an essentially U-shaped securing element 100 which in the illustrated example of embodiment is likewise made of plastic. As can be seen in particular from FIG. 8, the elastically expandable securing element 100 which extends transversely over the blind hole 88, in the same way as the securing element 94, co-operates with a radial groove 102 on the outer circumference of the insertion part 48 in order to secure the latter in the axial direction in the blind hole 88 of the base part 44.

As shown in particular in FIG. 12, the insertion part 48 is provided on its outer circumference with further radial grooves 104, 106, 108. Of these, as can be seen from FIGS. 2 to 7, the radial grooves 104 and 108 serve to receive O-rings 110 and 112, respectively, of which the upper O-ring 110 in FIGS. 2 to 7 seals the plug-in connection of the housing 42, that is to say base part 44 and insertion part 48, with respect to the outside. The lower O-ring 112 in FIGS. 2 to 7 serves to seal a plug-in connection, known per se, with respect to a receiving part (not shown) which is fitted on the hydraulic line 16. The lower section of the insertion part 48 in FIG. 12, which is provided on its outer circumference with a plug-in connection contour, can be inserted into this receiving part which is designed in the same way as the upper section of the base part 44 in FIG. 10, where it can be secured against being pulled out in the axial direction by means of a securing element (not shown) which corresponds to the securing element 94 and engages in the radial groove 106.

The insertion part 48 is furthermore provided with a stepped through-bore 114, in the upper section of which in FIG. 12 firstly the second spring element 64 and then the second valve body 54 are accommodated, as seen from bottom to top in FIGS. 2 to 7. The second spring element 64 is supported on webs 116 (see FIGS. 8 and 12) which are provided in a cross arrangement in the through-bore 114. Further webs 118 (see once again FIGS. 8 and 12), which are arranged in a cross shape and are offset by an angle of 45° with respect to the webs 116, center the second spring element 64 in the through-bore 114.

As shown in FIGS. 13 to 16, the first valve body 52 is designed essentially in a pot-shaped manner, with a bottom 120, on the end side of which the valve seat 62 for the second valve body 54 is located, and an outer wall 122 which extends away from the bottom 120. As can be seen in FIGS. 2 to 7, the first spring element 56 extends into the first valve body 52, where it bears against the bottom 120 of the first valve body 52. The bottom 120 of the first valve body 52 is also provided with a through-bore 124, on the inner circumferential face of which the second valve body 54 is guided. On its outer circumference, that is to say on the outer side of its outer wall 122, the first valve body 52 is provided with a plurality of, in the illustrated example of embodiment six, ribs 126 which are spaced apart at uniform angles and are oriented in the direction of the axis. The ribs 126, which protrude in the axial direction beyond the outer wall 122 in a corona-like manner on the side facing away from the bottom 120, serve to guide the first valve body 52 in the blind hole 88 of the base part 44 of the housing 42 and together with the wall of the blind hole 88 in the housing 42 delimit the further through-path 66 in the valve arrangement 40, as can be seen in FIGS. 2 to 7.

As shown in FIGS. 17 to 20, the plunger-like second valve body 54 has a central disc section 128 from which a centring protrusion 130 for the second spring element 64 extends upwards in FIG. 18, said centring protrusion being cylindrical in its basic shape, while a guide protrusion 132 which is likewise cylindrical in its basic shape adjoins the disc section 128 in the downward direction in FIG. 18. The guide protrusion 132—like the centring protrusion 130—is provided on its outer circumference with a plurality of, in the illustrated example of embodiment three, recesses 134 which run in the longitudinal direction of the second valve body 54, are spaced apart at uniform angles and are round when seen in cross section, so that the guide protrusion 132 has the same number of webs 136 arranged in a star shape as shown in FIG. 20. As can be seen from FIGS. 2 to 7, the webs 136 serve to guide the second valve body 54 in the through-bore 124 in the bottom 120 of the first valve body 52 and together with the wall of the through-bore 124 delimit the (first) through-path 60 for the hydraulic fluid in the first valve body 52.

Finally, the diagram shown in FIG. 23 clearly illustrates the effect of vibrational tests of the above-described valve arrangement 40 compared to a conventional slave cylinder with cylindrical piston and piston rod articulated thereto, via which sine vibration was introduced into the system. Without using the above-described valve arrangement 40 (curve with rhombus marking), vibrations with considerable accelerations were measured on the piston rod 20 of the master cylinder 12, particularly in resonance cases, for example vibration excitation at 80 Hz. By using the above-described valve arrangement 40 (curve with cross marking), these vibrations could be screened off very well from the master cylinder 12, particularly at frequencies above 80 Hz. By using the flow transducer 72, it was possible to improve this effect still further, particularly at frequencies below 80 Hz, as can be seen by comparing the two lower curves (simple cross marking: without flow transducer 72; star marking: with flow transducer 72).

In summary, there is disclosed a valve arrangement for vibration decoupling, the valve arrangement comprising a housing, in which two valve bodies are accommodated, a first of which is biased by a spring in a reference direction towards a stop integral with the housing and has a through-path for fluid, whereas the other is biased by a spring in an opposite direction towards a valve seat on the first valve body and lifts away from the latter in the event of a volume flow in the reference direction, so as to open the through-path for fluid. According to the invention, a further through-path for fluid is provided between the first valve body and the housing, wherein a further valve seat is formed on the stop integral with the housing, towards which further valve seat the first valve body is biased by a spring and lifts away from said valve seat in the event of a volume flow in the opposite direction, so as to open the further through-path for fluid. As a result, a valve arrangement of simple and compact design is provided which has low resistance to displacement of the hydraulic fluid and makes it possible to effectively prevent the transmission of vibrations.

We claim:

1. Valve arrangement for vibration decoupling, which can be connected between a master cylinder and a slave cylinder of a hydraulic force transmission system, said valve arrangement comprising a housing, which has a first and a second hydraulic connection, and two valve bodies, which are accommodated between the hydraulic connections in the housing, wherein the first valve body is biased by means of a first spring element in a first direction towards a stop integral with the housing and has a through-path for the hydraulic fluid, and wherein the, second valve body is biased by means of a second spring element in a second direction—which is opposite to the first direction—towards a first valve seat on the first valve body, so that the second valve body in a basic position of the valve arrangement completely or almost completely closes the through-path in the first valve body and, in the event of a volume flow in the first direction, lifts away from the first valve seat so as to open the through-path in order to allow fluid flow through the valve arrangement;

wherein a further through-path for the hydraulic fluid is provided between the first valve body and the housing;

wherein a further valve seat is formed on the stop integral with the housing, towards which further valve seat the first valve body is biased, so that the first valve body in the basic position of the valve arrangement completely or almost completely closes the further through-path and, in the event of a volume flow in the second direction, lifts away from the further valve seat so as to open the further through-path in order to allow fluid flow through the valve arrangement;

wherein a sealing face of at least one of the first valve seat and the further valve seat is perpendicular to a displacement direction of the first and the second valve body, respectively, and wherein the sealing face of the first valve seat and the sealing face of the further valve seat lie in one plane and are co-planar in the basic position of the valve arrangement.

2. Valve arrangement according to claim 1, wherein the housing is split into two parts, comprising a base part and an insertion part secured therein, wherein the valve bodies and the spring elements are arranged between the base part and the insertion part.

3. Valve arrangement according to claim 2, wherein an end face of the insertion part forms the stop integral with the housing for the first valve body.

4. Valve arrangement according to claim 1, wherein the second valve body is guided on the first valve body.

5. Valve arrangement according to claim 4, wherein the second valve body is provided on its outer circumference with a plurality of webs which serve to guide the second valve body in a bore of the first valve body and together with the wall of the valve body bore delimit the through-path for the hydraulic fluid.

6. Valve arrangement according to claim 1, wherein the first valve body is provided on its outer circumference with a plurality of ribs which serve to guide the first valve body in a bore of the housing and together with the wall of the housing bore delimit the further through-path for the hydraulic fluid.

7. Valve arrangement according to claim 1, wherein at least one of the first spring element and the second spring element is a helical pressure spring.

8. Valve arrangement according to claim 1, wherein at least one of the housing, the parts thereof, the first valve body and the second valve body is injection-molded from plastic material.

9. Valve arrangement for vibration decoupling, which can be connected between a master cylinder and a slave cylinder of a hydraulic force transmission system, said valve arrangement comprising a housing, which has a first and a second hydraulic connection, and two valve bodies, which are accommodated between the hydraulic connections in the housing, wherein the first valve body is biased by means of a first spring element in a first direction towards a stop integral with the housing and has a through-path for the hydraulic fluid, and wherein the second valve body is biased by means of a second spring element in a second direction—which is opposite to the first direction—towards a first valve seat on the first valve body, so that the second valve body in a basic position of the valve arrangement completely or almost completely closes the through-path in the first valve body and, in the event of a volume flow in the first direction, lifts away from the first valve seat so as to open the through-path in order to allow fluid flow through the valve arrangement;
   wherein a further through-path for the hydraulic fluid is provided between the first valve body and the housing;
   wherein a further valve seat is formed on the stop integral with the housing, towards which further valve seat the first valve body is biased, so that the first valve body in the basic position of the valve arrangement completely or almost completely closes the further through-path and, in the event of a volume flow in the second direction, lifts away from the further valve seat so as to open the further through-path in order to allow fluid flow through the valve arrangement; and
   wherein a flow transducer is mounted in a bore of the housing, adjacent to one of the first and second valve bodies, which flow transducer can be elastically deformed under pressure in order to reduce residual vibrations.

10. Valve arrangement according to claim 9, wherein the flow transducer is a rubber-elastic, spool-shaped element comprising a through-bore which allows flow of the fluid through the flow transducer and an annular recess on the outer circumference, which together with an inner circumferential face of the housing bore, forms an annular air chamber.

11. Valve arrangement according to claim 9, wherein the flow transducer is designed to be rotationally symmetrical with respect to a longitudinal axis and mirror-symmetrical with respect to an imaginary plane perpendicular to the longitudinal axis.

12. A hydraulic force transmission system having a master cylinder, a slave cylinder and a valve arrangement for vibration decoupling that is connected between a the master cylinder and a the slave cylinder, said valve arrangement comprising a housing, which has a first and a second hydraulic connection, and two valve bodies, which are accommodated between the hydraulic connections in the housing, wherein the first valve body is biased by means of a first spring element in a first direction towards a stop integral with the housing and has a through-path for the hydraulic fluid, and wherein the second valve body is biased by means of a second spring element in a second direction—which is opposite to the first direction—towards a first valve seat on the first valve body, so that the second valve body in a basic position of the valve arrangement completely or almost completely closes the through-path in the first valve body and, in the event of a volume flow in the first direction, lifts away from the first valve seat so as to open the through-path in order to allow fluid flow through the valve arrangement;
   wherein a further through-path for the hydraulic fluid is provided between the first valve body and the housing, and wherein a further valve seat is formed on the stop integral with the housing, towards which further valve seat the first valve body is biased, so that the first valve body in the basic position of the valve arrangement completely or almost completely closes the further through-path and, in the event of a volume flow in the second direction, lifts away from the further valve seat so as to open the further through-path in order to allow fluid flow through the valve arrangement;
   wherein the master cylinder is hydraulically connected to the slave cylinder via a hydraulic line;
   wherein the valve arrangement is connected into the hydraulic line in such a way that the first hydraulic connection of the valve arrangement is hydraulically connected to the master cylinder and the second hydraulic connection of the valve arrangement is hydraulically connected to the slave cylinder, and
   wherein the valve arrangement is connected into the hydraulic line closer to the slave cylinder than to the master cylinder.

13. A hydraulic force transmission system according to claim 12, wherein the valve arrangement further comprises a flow transducer and is positioned in such a way that the flow transducer is arranged between the slave cylinder and the first and second valve bodies in the housing of the valve arrangement.

14. A hydraulic force transmission system according to claim 12, wherein the valve arrangement further comprises a flow transducer and is positioned in such a way that the flow transducer is arranged between the master cylinder and the first and second valve bodies in the housing of the valve arrangement.

* * * * *

UNITED STATES PATENT AND TRADEMARK OFFICE
CERTIFICATE OF CORRECTION

PATENT NO.       : 7,578,378 B2
APPLICATION NO.  : 11/412638
DATED            : August 25, 2009
INVENTOR(S)      : Gebert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 441 days.

Signed and Sealed this

Seventh Day of September, 2010

David J. Kappos
*Director of the United States Patent and Trademark Office*